(12) United States Patent
Kalech et al.

(10) Patent No.: US 10,437,702 B2
(45) Date of Patent: Oct. 8, 2019

(54) DATA-AUGMENTED SOFTWARE DIAGNOSIS METHOD AND A DIAGNOSER THEREFOR

(71) Applicant: B. G. Negev Technologies and Applications Ltd., at Ben-Gurion University, Beer Sheva (IL)

(72) Inventors: Meir Kalech, Modiin Maccabim Reut (IL); Ron Zvi Stern, Modiin Maccabim Reut (IL); Amir Elmishali, Dimona (IL)

(73) Assignee: B. G. Negev Technologies and Applications Ltd., at Ben-Gurion University, Beer Sheva (IL)

( * ) Notice: Subject to any disclaimer, the term of this patent is extended or adjusted under 35 U.S.C. 154(b) by 56 days.

(21) Appl. No.: 15/442,773

(22) Filed: Feb. 27, 2017

(65) Prior Publication Data

US 2017/0249234 A1    Aug. 31, 2017

Related U.S. Application Data

(60) Provisional application No. 62/300,951, filed on Feb. 29, 2016.

(51) Int. Cl.
*G06F 11/00* (2006.01)
*G06F 11/36* (2006.01)
*G06N 20/00* (2019.01)
*G06F 11/07* (2006.01)

(52) U.S. Cl.
CPC ...... *G06F 11/3616* (2013.01); *G06F 11/0793* (2013.01); *G06F 11/3636* (2013.01); *G06N 20/00* (2019.01)

(58) Field of Classification Search
CPC ............. G06F 11/3616; G06F 11/3636; G06F 11/079; G06F 11/0793; G06F 11/0781; G06F 11/0787; G06F 11/3612; G06N 99/005; G06N 20/00
See application file for complete search history.

(56) References Cited

U.S. PATENT DOCUMENTS

| | | | |
|---|---|---|---|
| 2011/0022551 A1* | 1/2011 | Dixon | G06F 11/3616 706/12 |
| 2011/0185229 A1* | 7/2011 | Lapiotis | G06F 11/0709 714/25 |
| 2015/0112903 A1* | 4/2015 | Chan | G06F 17/30961 706/12 |
| 2016/0012451 A1* | 1/2016 | Shanmugam | G06Q 30/016 705/304 |

OTHER PUBLICATIONS

Abreu et al. (Spectrum-based Multiple Fault Localization, Automated Software Engineering, 2009. ASE '09. 24th IEEE/ACM International Conference on, 2009) (12 pages).

(Continued)

*Primary Examiner* — Joseph D Manoskey
(74) *Attorney, Agent, or Firm* — Roach Brown McCarthy & Gruber, P.C.; Kevin D. McCarthy

(57) ABSTRACT

The present invention is directed to a method for diagnosing faults in a software system, according to which, predictions of the probability of each software component of the software system to be faulty are obtained from a diagnoser, and the probability predictions are input to a fault diagnosis software module, executed by the diagnoser.

13 Claims, 2 Drawing Sheets

(56) References Cited

OTHER PUBLICATIONS

Radjenovic et al. (Software fault prediction metrics: A systematic literature review (2013), Information & Software Technology 55(8): 1397-1418 (22 pages).
Zamir et al. (Zamir, T.; Stem, R.; and Kalech, M; 2014; Using model-based diagnosis to improve software testing; AAAI Conference on Artificial Intelligence) (7 pages).

* cited by examiner

DATA-AUGMENTED SOFTWARE DIAGNOSIS METHOD AND A DIAGNOSER THEREFOR

FIELD OF THE INVENTION

The present invention relates to the field of software faults. More particularly, the invention relates to a method and a diagnoser, for improving software fault diagnosis.

BACKGROUND OF THE INVENTION

Software applications are comprised of individual software components, each of which performs a set of behaviorally related functions. An example of software components is a software module that controls a GPS receiver of a mobile phone. Another example is a software module that controls the loudspeaker of a mobile device.

Software failures are common, and their impact can be very harmful. As a result, there is a growing need for automated tools for identifying and diagnosing software failures and isolating the faulty software components, such as classes and functions, which caused the failure. For example, failure of a navigation application may be caused by a bug in the GPS receiver software module or in the loudspeaker software module.

Software fault prediction algorithms use machine learning techniques to predict which software component is likely to contain faults. In contrast, software diagnosis algorithms use model-based or spectrum-based approaches to identify faulty software components that caused a failure.

One method of automated diagnosis is Model Based Diagnosis (MBD), which uses a model of the diagnosed system to infer possible explanations of the observed system failures. Traditionally, when diagnosing a software system, MBD algorithm receive as input: a) a formal description of the system, i.e. a logical model of the correct functionality of each component in the system, b) the set of components in the system that may be faulty, and c) a set of observed test executions, each test labeled "passed" or "failed". While MBD has successfully been applied to a range of domains, it has not been applied successfully to software, because there is usually no formal model of a developed software application.

Spectrum-based Fault Localization (SFL) is another method of diagnosing software faults that does not require a logical model of the correct functionality of each software component in the system. SFL considers traces of software executions and diagnoses by considering the correlation between execution traces and failed executions.

Abreu et al. (*Spectrum-based Multiple Fault Localization*, Automated Software Engineering, 2009. ASE '09. 24th IEEE/ACM International Conference on, 2009) propose using a scalable software diagnosis algorithm called BARINEL (Bayesian AppRoach to dIagnose iNtErmittent fauLts) for diagnosing software faults. BARINEL utilizes a combination of MBD and SFL approaches. The key concept of BARINEL is to consider traces of tests with failed outcome as conflicts, and returning their hitting sets (an algorithm that is used to find diagnoses which explain all observed discrepancies, represented as conflicts) as diagnoses. BARINEL often outputs a large set of diagnoses, thus providing weak guidance to a programmer that is appointed to solve a bug observation. To address this problem, Abreu et al. proposed a Bayesian approach to compute a likelihood score for each diagnosis returned by the algorithm. Then, diagnoses are prioritized according to their likelihood scores.

For a given diagnosis, BARINEL computes the likelihood score by computing the posterior probability that it is correct, given observed test passes and fails. As a Bayesian approach, BARINEL also requires some assumption about the prior probability of each component to be faulty. Traditionally, the prior probabilities used by BARINEL represent the a-priori probability of a component to be faulty, without considering any observed system behavior.

It is therefore an object of the present invention to improve the accuracy of BARINEL software diagnosis.

Other objects and advantages of this invention will become apparent as the description proceeds.

SUMMARY OF THE INVENTION

The present invention is directed to a method for diagnosing faults in a software system, according to which, predictions of the probability of each software component of the software system to be faulty are obtained from a diagnoser, and the probability predictions are input to a fault diagnosis software module, executed by the diagnoser.

Preferably, the method comprises the following steps:
a. obtaining from a version control system, records of modifications performed in software components of the software system;
b. obtaining from an issue tracking system, records of component faults and component fault fixes for each of the components;
c. providing as input to a machine learning algorithm the records;
d. defining a set of features capable of characterizing any software component;
e. characterizing components of the software system by deriving, from the input, values for the features;
f. associating, by the machine learning algorithm, between feature values of a component and whether the component is faulty or healthy;
g. generating, as output from the machine learning algorithm, a prediction model, capable of classifying a component as faulty or healthy according to feature values of the component, and assigning a probability of each classification;
h. generating, using the classification and probability, a score being a real number indicating the probability of each component of the software system to be faulty, according to feature values of the components;
i. inputting to a fault diagnosis software module: i) the components of the system; ii) a set of observed test executions with their traces, each test labeled "passed" or "failed" iii) the score of each component as a prior probability of each component to be faulty; and
j. outputting diagnoses from the fault diagnosis software module, indicating for each component whether it is faulty or healthy, and a posterior probability of each diagnosis to be correct.

The software components may be software files, software functions, or software code lines.

The features extracted for each software component may comprise:
a. at least the McCabe and Halstead complexity measures;
b. the number of methods overriding a superclass;
c. the number of public methods;
d. the number of other classes referenced; the class abstract;

e. the age of the source file; the number of revisions made to the source file in the last release; the number of developers who contributed to the development of the source file; and f. the number of lines changed since the latest version.

Preferably, Conf(C), the confidence score of a component C, is equal to:

$$Conf(C) = \begin{cases} Prob(d) : d = \text{faulty} \\ 1 - Prob(d) : d \neq \text{faulty} \end{cases}$$

The present invention is also directed to diagnoser for diagnosing faults in a software system, which is configured to:

a) obtain predictions of the probability of each software component of the software system to be faulty;
b) receive the probability predictions as inputs;
c) process the probability predictions; and
d) output diagnoses indicating for each component, whether it is faulty or healthy, and a posterior probability of each outputted diagnosis to be correct.

The diagnoser may be configured to:

a) obtain records of modifications performed in software components from a version control system;
b) obtain from an issue tracking system, records of component faults and component fault fixes for each of the components;
c) provide as input to a machine learning algorithm the records;
d) define a set of features capable of characterizing any software component;
e) characterize components of the software system by deriving, from the input, values for the features;
f) associate, by the machine learning algorithm, between feature values of a component and whether the component is faulty or healthy;
g) generate, as output from the machine learning algorithm, a prediction model, capable of classifying a component as faulty or healthy according to feature values of the component, and assigning a probability of each classification;
h) generate, using the classification and probability, a score being a real number indicating the probability of each component of the software system to be faulty, according to feature values of the components;
i) input to a fault diagnosis software module: i) the components of the system; ii) a set of observed test executions with their traces, each test labeled "passed" or "failed" iii) the score of each component as a prior probability of each component to be faulty; and
j) output diagnoses from the fault diagnosis software module, indicating for each component whether it is faulty or healthy, and a posterior probability of each diagnosis to be correct.

The diagnoser may be used for diagnosing faults in software components of a software module that controls a GPS receiver.

DETAILED DESCRIPTION OF THE INVENTION

The present invention proposes a method for improving the BARINEL software fault diagnosis by using software fault predictions as priors (i.e., prior probability distributions) to be used by BARINEL. Fault prediction is able to detect which software components within a system are more likely than others to contain a bug (a coding error in a program).

Thanks to recent advancements in the field of software engineering tools (such as version control and issue tracking systems), there is much more information about system behavior than revealed by the traces of performed tests that are used by BARINEL (software tracing is logging to record information about a program's execution to debug and diagnose common problems with software). For example, version control systems store all revisions of every source file, and it is quite common for a bug to occur in a source file that was recently revised. Unfortunately, BARINEL is agnostic to data of this sort.

The goal of fault prediction in software is to classify software components, i.e., to determine whether a given software component is healthy or faulty. Supervised machine learning algorithms are commonly used to solve classification problems.

Figure 1:
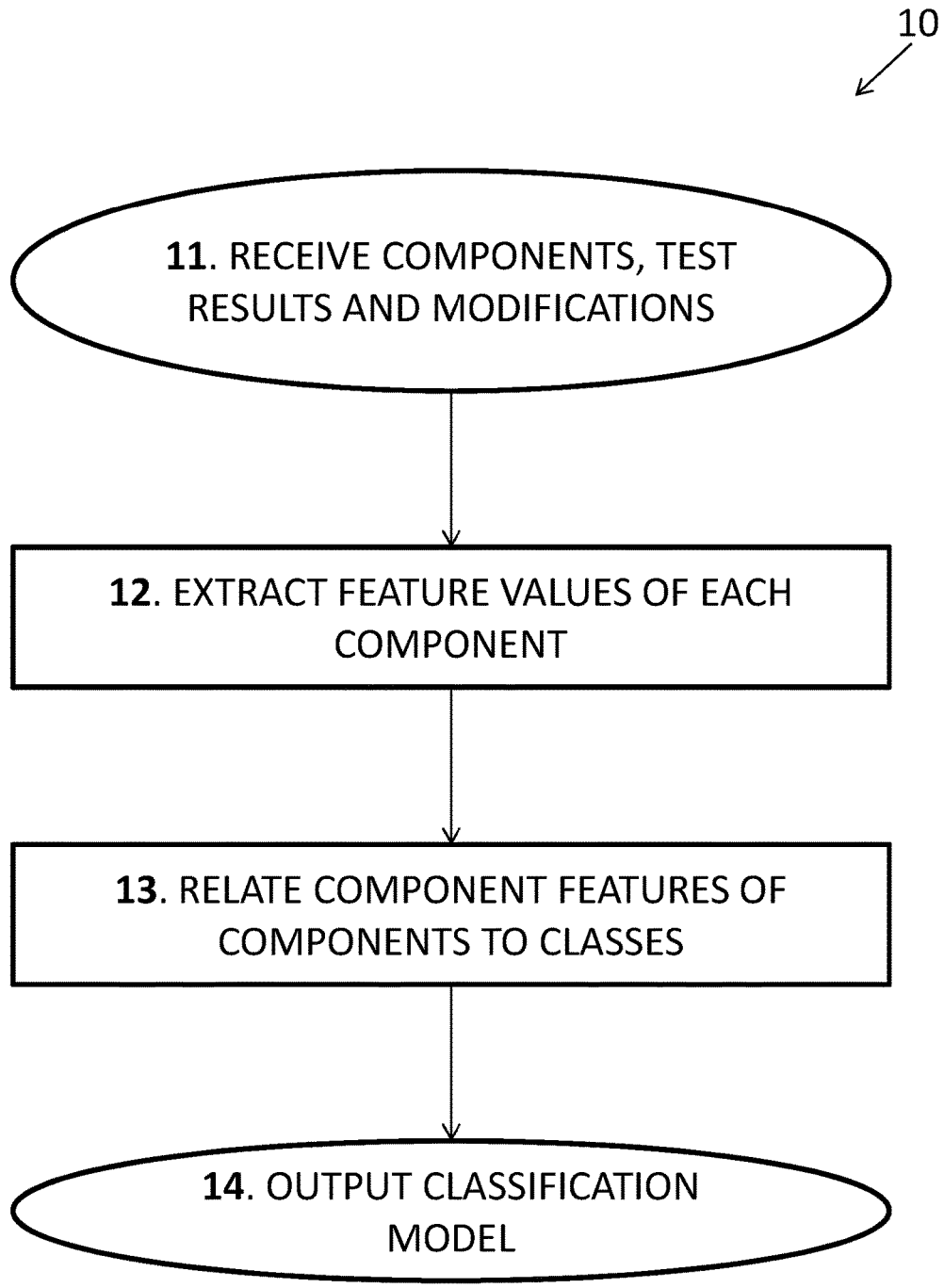
FIG. 1 shows a flowchart 10 of a machine learning algorithm.

FIG. 1 shows a flowchart 10 of a machine learning algorithm. At the first stage 11, the algorithm receives, as input, a set of software components (instances) and their correct labeling, i.e., the true class of each instance—healthy or faulty. At the next stage 12, various features are extracted for a given component, as will be described hereinafter. At the next stage 13, the algorithm learns from the given labeled instances, the relation between the features of an instance and its class. At the final stage 14, a classification model is output, which maps a component to a class.

Figure 2:
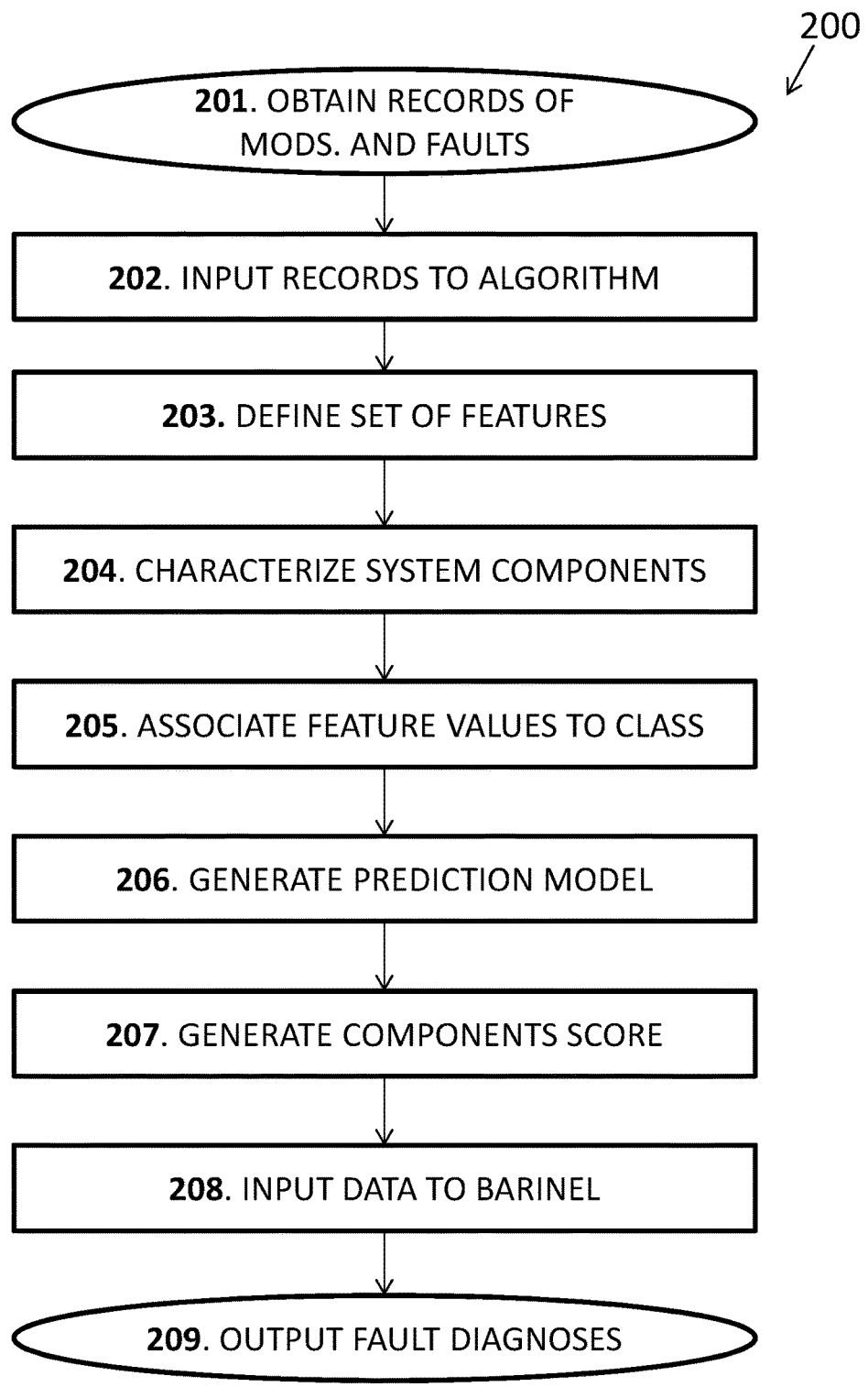
FIG. 2 shows a flowchart of the process of diagnosing faults in a software system, according to an embodiment of the invention.

FIG. 2 shows a flowchart 200 describing the process of diagnosing faults in a software system, according to an embodiment of the invention. At the first stage 201, records of modifications performed in software components of the software system, are obtained from a version control system, and records of component faults and component fault fixes for each of said components are obtained from an issue tracking system. At the next stage 202, the modification and fault records are provided as input to a machine learning algorithm. At the next stage 203, a set of features capable of characterizing any software component, is defined. At the next stage 204, the components of the software system are characterized by deriving values for the features from the data input at stage 201. At the next stage 205, feature values are associated to the class of the components (i.e. whether the component is faulty or healthy), by the machine learning algorithm, according to the data input at stage 201. At the next stage 206, a prediction model is generated, which is capable of classifying a component as faulty or healthy, according to the features values of a component. At the next stage 207, the probability of each component of the software system to be faulty is calculated, and a score indicating the probability is generated. At the next stage 208, the score of each component is input to a BARINEL fault diagnosis software module, along with the components of the system, and a set of observed test executions with their traces, where each test is labeled "passed" or "failed". Finally at the next step 209, diagnoses are outputted from the BARINEL module, indicating for each component whether it is faulty or healthy and a posterior probability of each diagnosis to be correct.

Radjenovic et al. (Software fault prediction metrics: A systematic literature review (2013), Information & Software Technology 55(8): 1397-1418) disclose a survey of features used by existing software prediction algorithms and categorize them into three families: traditional, object oriented, and process features. Traditional features are software complexity metrics, such as McCabe (a software quality metric that quantifies the complexity of a software program. Complexity is inferred by measuring the number of linearly independent paths through the program. The higher the number the more complex the code) and Halstead (metrics to measure software complexity metrics depending upon the actual implementation of program and its measures, which are computed directly from the operators and operands from source code, in a static manner) complexity measures and number of lines of code. Object oriented features are software complexity metrics that are specifically designed for object oriented programs. This includes metrics like cohesion (the degree to which the elements of a module belong together. Cohesion measures the strength of relationship between pieces of functionality within a given module) and coupling (the degree of interdependence between software modules) levels, and depth of inheritance (in object-oriented systems, Depth of Inheritance Tree is the maximum length of a path from a class to a root class in the inheritance structure of a system. It measures how many super-classes can affect a class). Process features are computed from the software change history. They capture the dynamics of the software development process, considering metrics such as lines added and deleted in the previous version, and the age of the software component.

The set of features, extracted in stage 12 of the machine learning algorithm, is comprised of a combination of 115 features from the features listed by Radjenovic et al. This list of features includes the McCabe and Halstead complexity measures, several object oriented measures, such as the number of methods overriding a superclass, the number of public methods, the number of other classes referenced, and whether or not the class abstract, in addition to several process features such as the age of the source file, the number of revisions made to it in the last release, the number of developers who contributed to its development, and the number of lines changed since the latest version.

BARINEL requires a real number that estimates the prior probability of each component being faulty. In order to estimate priors from the fault prediction model described hereinabove, a confidence score is used. A confidence score indicates the model's confidence about the classified class, and is standardly output by most prediction models. If Conf(C) denotes the confidence for a component C., then according to an embodiment of the invention, BARINELS's prior is defined as Conf(C) if C is classified as faulty, and 1−Conf (C) otherwise.

For both learning and testing a fault prediction model, mapping is required between a reported bug and the source files that were faulty and caused it. Manually tracking past bugs and tracing back their root cause is clearly not a scalable solution. Most modern projects use a version control system (a system that records changes to a file or set of files over time so that you can recall specific versions later) and an issue tracking (a software package that manages and maintains lists of issues) system. Version control systems, such as Git (a distributed version control system for tracking changes in computer files) and Mercurial (a cross-platform, distributed revision-control tool for software developers), track modification performed in source files. Issue tracking systems, such as Bugzilla (a web-based general-purpose bugtracker and testing tool of Mozilla Foundation, Mountain View, Calif., U.S.A.) and Trac (Edgewall Software, Umeå, Sweden), record all reported bugs/faults and track changes in their status, including when a bug/fault is fixed. A key feature in modern issue tracking and version control systems is that they enable tracking a modification to source files in order to fix a specific fault.

Not all files that are modified during the fixing of a bug actually caused the bug. For example, some bug fixes include adding a parameter to a function, consequently modifying all places where that function is called, although not all places could be regarded as "faulty" source files. As a crude heuristic to overcome this problem, for a given bug X, the only file considered was the source file whose revision was most extensive among all files associated with fixing bug X.

Experimental Results

The proposed data-augmented approached was implemented and evaluated as follows. As a benchmark, the open source files has been used and bugs reported for three popular open-source projects: (1) Eclipse CDT (eclipse.org/cdt), which is an IDE for C/C++ that is part of the Eclipse platform, (2) Apache Ant (ant.apache.org), which is a build tool, and (3) Apache POI (poi.apache.org), which provides a Java API for Microsoft documents. All projects are written in Java language. Table 1 lists in the columns "Start", "Ver.", "Files", and "Bugs" the year that the project started, the version number (including minor version) at the time of the experiment, the number of Java source files at the time of the experiment and the number of bugs reported and fixed at the time of the experiment, respectively.

TABLE 1

| Project | Start | Ver. | Files | Bugs |
| --- | --- | --- | --- | --- |
| CDT (eclipse.org/cdt) | 2002 | 231 | 8,750 | 9,091 |
| POI (poi.apache.org) | 2002 | 72 | 2,810 | 1,408 |
| Ant (ant.apache.org) | 200 | 72 | 1,195 | 1,176 |

All three projects use the Git version control system and the Bugzilla issue tracking system. For each project, the latest version has been used as a test set and the four versions before it as a training set. The first set of results reported is the quality of our fault prediction model on these three benchmarks. The Weka software package (www.cs.waikato.ac.nz/ml/weka) was used to experiment with several learning algorithms. In a preliminary comparison it was found that the Random Forest learning algorithm to perform best.

Table 2 shows the precision, recall, F-measure, and Area Under Curve (AUC—a common evaluation metric for binary classification problems) of the fault prediction models generated by Random forest (with 1,000 trees) for each of the benchmark projects. Precision, recall, F-measure, and AUC are standard metrics for evaluating classifiers. In brief, precision is the ratio of faulty files among all files identified by the evaluated model as faulty. Recall is the number of faulty files identified as such by the evaluated model, divided by the total number of faulty files. F-measure is a known combination of precision and recall. The AUC metric addresses the known tradeoff between recall and precision, where high recall often comes at the price of low precision.

This tradeoff can be controlled by setting different sensitivity thresholds to the evaluated model. AUC is the area under the curve plotting the accuracy as a function of the recall (every point represents a different threshold value). All metrics range between zero and one (where one is the optimal value) and are standard metrics in machine learning and information retrieval. More details are specified in Machine Learning books, e.g. *Machine Learning*; Tom Mitchell; McGraw-Hill Science/Engineering/Math; 1997.

TABLE 2

| Project | Precision | Recall | F-Measure | AUC |
|---|---|---|---|---|
| ANT | 0.206 | 0.175 | 0.189 | 0.775 |
| CDT | 0.550 | 0.086 | 0.149 | 0.846 |
| POI | 0.280 | 0.252 | 0.265 | 0.845 |

As the results show, while AUC scores are reasonable, the precision and especially recall results are fairly low. This is understandable, as most files are not faulty, and thus the training set is very imbalanced. An imbalanced data set is a known inhibitor of the performance of standard learning algorithms. Several known methods to handle imbalanced datasets, such as SMOTE and random under sampling have been tested. The prediction model proposed by the present invention is capable of improving existing data-agnostic software diagnosis algorithm.

Diagnosis Performance

The data-augmented diagnoser proposed by the present invention has been evaluated using the fault prediction model described above. The input to the diagnoser is a set of tests, with their traces and outcomes, and the output is a set of diagnoses, where each diagnosis has a score that estimates its correctness. This score was computed by BARINEL as described earlier, where the data-agnostic diagnoser uses uniform priors and the proposed data-augmented diagnoser uses the predicted fault probabilities from the learned model.

Each of the software projects used includes a test package that contains automated tests that can be run automatically. For every experiment, a package was chosen along with a known bug that occurred in the package. Then, a subset of the automated tests that test this package were chosen and ran to record their trace. Test outcome was simulated by assuming that a bug that is in a trace has a probability of 0.2 to fail. This is added because a natural behavior of a software faulty component is that it does not always cause tests passing through it to fail.

To compare the set of diagnoses returned by the different diagnosers, the weighted average of their precision and the recall have been computed as follows. First, the precision and recall of every returned diagnosis was computed. Then, the precision and recall of all the returned diagnoses have been averaged, weighted by the score given to the diagnoses by BARINEL, normalized to one. This enables aggregating the precision and recall of a set of diagnoses, while incorporating which diagnoses are regarded as more likely according to BARINEL. For sake of brevity, this weighted average precision and weighted average recall are referred to as simply precision and recall.

The rows "Agn." and "Aug." in Table 3 show the average precision and recall for the data-agnostic and data-augmented diagnosers, respectively. The rows "Syn (0.1)" and "Syn (0.0)" will be explained later on. A problem instance consists of (1) a bug, and (2) a set of observed tests, chosen randomly, while ensuring that at least one test would pass through the faulty files. Experiment was made with 10, 20, 30, and 40 observed tests (along with their traces and outcomes), corresponding to the columns of Table 3. Each result in the table is an average over the precision and recall obtained for 50 problem instances.

Both precision and recall of the data-augmented and data-agnostic diagnosers show that a data-augmented diagnoser can yield substantially better diagnoses than a data-agnostic diagnoser. For example, the precision of the data-augmented diagnoser for the POI project with 20 tests is 0.76, while it is only 0.60 for the data-agnostic diagnoser.

Building better fault prediction models for software is an active field of study (see Radjenovic et al., 2013) and thus future fault prediction models may be more accurate than the ones used by the proposed data-augmented diagnoser. To evaluate the potential benefit of a more accurate fault prediction model on the proposed data-augmented diagnoser, a synthetic fault prediction model has been created, in which faulty source files get $P_f$ probability and healthy source files get $P_h$, where $P_f$ and $P_h$ are parameters. Setting $P_h = P_f$ would cause the data-augmented diagnoser to behave in a uniform distribution exactly like the data-agnostic diagnoser, setting the same prior probability for all source files to be faulty. In contrast, setting $P_h=0$ and $P_f=1$ represent an optimal fault prediction model, that exactly predicts which files are faulty and which are healthy.

The lines marked "Syn. (X)" in Table 3 mark the performance of the data-augmented diagnoser when using this synthetic fault prediction model, where $X=P_h$ and $P_f=0.6$. Experiments were made with many values of $P_f$ and $P_h$, and presented above a representative subset of these results.

As expected, lowering the value of $P_h$ results in detection of more correct diagnoses. Setting a very low $P_h$ value improves the precision significantly up to almost perfect precision in some cases (0.99 for ANT when given 20 observed tests). This clearly demonstrates the potential benefit of the proposed data-augmented approach.

TABLE 3

| Tests | Precision | | | | Recall | | | |
|---|---|---|---|---|---|---|---|---|
| | 10 | 20 | 30 | 40 | 10 | 20 | 30 | 40 |
| POI | | | | | | | | |
| Agn. | 0.56 | 0.60 | 0.61 | 0.61 | 0.51 | 0.54 | 0.54 | 0.55 |
| Aug. | 0.66 | 0.76 | 0.64 | 0.64 | 0.61 | 0.68 | 0.56 | 0.56 |
| Syn. (0.1) | 0.70 | 0.81 | 0.77 | 0.77 | 0.62 | 0.70 | 0.65 | 0.65 |
| Syn. (0.0) | 0.79 | 0.98 | 0.88 | 0.88 | 0.66 | 0.83 | 0.73 | 0.73 |
| CDT | | | | | | | | |
| Agn. | 0.60 | 0.49 | 0.46 | 0.45 | 0.52 | 0.41 | 0.38 | 0.38 |
| Aug. | 0.64 | 0.59 | 0.55 | 0.56 | 0.54 | 0.46 | 0.41 | 0.42 |
| Syn. (0.1) | 0.89 | 0.81 | 0.69 | 0.69 | 0.89 | 0.85 | 0.68 | 0.68 |
| Syn. (0.0) | 0.99 | 0.98 | 0.83 | 0.83 | 0.80 | 0.70 | 0.59 | 0.58 |
| ANT | | | | | | | | |
| Agn. | 0.58 | 0.68 | 0.68 | 0.68 | 0.48 | 0.49 | 0.49 | 0.49 |
| Aug. | 0.66 | 0.73 | 0.73 | 0.73 | 0.56 | 0.53 | 0.53 | 0.53 |
| Syn. (0.1) | 0.79 | 0.86 | 0.86 | 0.86 | 0.69 | 0.66 | 0.66 | 0.66 |
| Syn. (0.0) | 0.97 | 0.99 | 0.99 | 0.99 | 0.87 | 0.79 | 0.79 | 0.79 |

Troubleshooting Task

Troubleshooting algorithms choose which tests to perform to find the most accurate diagnosis. Efficient diagnosers are key components of troubleshooting algorithms. Zamir et al. (Zamir, T.; Stern, R.; and Kalech, M; 2014; *Using model-based diagnosis to improve software testing*; AAAI Conference on Artificial Intelligence) propose several troubleshooting algorithms specifically designed to work with BARINEL for troubleshooting software bugs. The study described below evaluated the impact of our data-augmented diagnoser on the overall performance of troubleshooting algorithms. Specifically, the so-called Highest Probability (HP) troubleshooting algorithm has been implemented, in which tests are chosen in the following manner. The HP troubleshooting algorithm chooses a test that is expected to pass through the source file having the highest probability of being faulty, given the diagnoses probabilities.

The HP troubleshooting algorithm was run with each of the diagnosers mentioned above (all rows in Table 3). The results of the HP troubleshooting algorithm were compared using different diagnosers by counting the number of tests required to reach a diagnosis of score higher than 0.7. The aim of a troubleshooting algorithm was to minimize the number of required tests. The basic assumption was that a data-augmented diagnoser will reduce the number of tests since the learned prior probabilities of the software components might direct the HP troubleshooting algorithm to select tests which pass through components with higher probability.

Table 4 is structured in a similar way to Table 3, except that it shows the average number of tests performed by the HP troubleshooting algorithm until it halts (in the "Steps" columns) and the precision of the found diagnosis (in the "Precision" columns). The results show the same overarching theme: the data-augmented diagnoser is better than the data-agnostic diagnoser for this troubleshooting task, being able to halt earlier with a higher quality diagnosis.

TABLE 4

| Tests | Steps | | | | Precision | | | |
|---|---|---|---|---|---|---|---|---|
| | 10 | 20 | 30 | 40 | 10 | 20 | 30 | 40 |
| POI | | | | | | | | |
| Agn. | 5.0 | 9.6 | 17.4 | 20.4 | 0.52 | 0.53 | 0.55 | 0.52 |
| Aug. | 4.4 | 7.4 | 9.8 | 17.4 | 0.63 | 0.69 | 0.68 | 0.55 |
| Syn. (0.1) | 2.8 | 4.0 | 10.0 | 8.6 | 0.62 | 0.71 | 0.69 | 0.72 |
| Syn. (0.0) | 0.2 | 0.0 | 0.0 | 1.0 | 0.74 | 0.91 | 0.88 | 0.85 |
| CDT | | | | | | | | |
| Agn. | 7.0 | 16.0 | 27.0 | 31.0 | 0.57 | 0.44 | 0.42 | 0.42 |
| Aug. | 5.2 | 8.4 | 15.8 | 13.0 | 0.66 | 0.58 | 0.52 | 0.53 |
| Syn. (0.1) | 2.0 | 7.4 | 14.4 | 18.6 | 0.74 | 0.73 | 0.72 | 0.76 |
| Syn. (0.0) | 0.0 | 0.0 | 0.4 | 0.0 | 0.92 | 0.88 | 0.84 | 0.87 |
| ANT | | | | | | | | |
| Agn. | 5.4 | 7.8 | 8.6 | 8.0 | 0.53 | 0.58 | 0.57 | 0.60 |
| Aug. | 4.0 | 6.6 | 6.0 | 6.8 | 0.57 | 0.67 | 0.64 | 0.67 |
| Syn. (0.1) | 3.6 | 5.0 | 5.6 | 4.6 | 0.70 | 0.71 | 0.71 | 0.75 |
| Syn. (0.0) | 0.0 | 0.0 | 0.0 | 0.0 | 0.89 | 0.92 | 0.92 | 0.92 |

The diagnoser may be used for diagnosing faults in software components of a software module that controls a GPS receiver.

As various embodiments have been described and illustrated, it should be understood that variations will be apparent to one skilled in the art without departing from the principles herein. Accordingly, the invention is not to be limited to the specific embodiments described and illustrated in the drawings.

The invention claimed is:

1. A method for diagnosing software faults in a software system developed by a plurality of distributed developers, comprising:
   a) modifying software components of a software system, by one or more of a plurality of terminal devices in data communication with a server, each of which is accessed by a different developer involved in development of said software system;
   b) recording, by a version control system provided with said server, modifications made to said software components;
   c) recording by an issue tracking system provided with said server, component faults and component fault fixes for each of said components;
   d) storing in a database in data communication with said server, version modification records and records of component faults and component fault fixes; and
   e) by a diagnoser module provided with said server,
      i) accessing said version modification and said component fault and component fault fix records;
      ii) counting, for each software component of said software system, a number of revisions made to a source file up to a last release and a number of developers who contributed to development of said source file; and
      iii) predicting that a given software component is faulty if the number of revisions or modifications is greater than a first predetermined threshold or if the number of developers who contributed to development of said source file is greater than a second predetermined threshold.

2. The method according to claim 1, wherein the diagnoser module additionally performs the following operations:
   a) providing the version modification records and the component fault and component fault fix records as input to a machine learning algorithm provided with the server;
   b) defining a set of features capable of characterizing any software component;
   c) characterizing components of said software system by deriving, from said input, values for said features;
   d) associating, by the machine learning algorithm, between said derived feature values of a component and whether the component is faulty or healthy; and
   e) generating a score being a real number indicating a probability of the given software component to be faulty, according to said derived feature values.

3. The method according to claim 2, wherein a fault diagnosis software module executed by the diagnoser module outputs a diagnosis, following processing of the fault prediction, indicating for the given software component, whether it is faulty or healthy, and outputs a posterior probability as to whether said outputted diagnosis is correct.

4. The method according to claim 3, wherein the software components are software files, software functions, or software code lines.

5. The method according to claim 3, wherein the diagnoser module inputs to the fault diagnosis software module: i) the components of the system; ii) a set of observed test executions with their traces, each test labeled "passed" or "failed"; and iii) the score of each component as a prior probability of each component to be faulty.

6. The method according to claim 2, wherein the derived features for each software component consist of one or more of the following:
   a) at least McCabe and Halstead complexity measures;
   b) a number of methods overriding a superclass;
   c) a number of public methods;
   d) a number of other classes referenced;

e) a class abstract;
f) an age of the source file; and
g) a number of lines changed since the latest version.

7. The method according to claim 2, wherein Conf(C), the confidence score of a component C, is equal to:

$$Conf(C) = \begin{cases} Prob(d): d = \text{faulty} \\ 1 - Prob(d): d \neq \text{faulty} \end{cases}$$

8. A computerized system for diagnosing software faults in a software system developed by a plurality of distributed developers, comprising:
   a) a plurality of terminal devices, each of which accessed by a different developer involved in development of said software system;
   b) a server in data communication with each of said terminal devices, said server comprising:
      i) a version control system for recording modifications performed with respect to software components associated with said software system;
      ii) an issue tracking system for recording component faults and component fault fixes for each of said components;
      iii) a cross-platform tool for associating two different developer-specific records one with another upon demand; and
      iv) a diagnoser for diagnosing faults in said software system; and
   c) a database in data communication with said server, in which are stored said version modification records and said records of component faults and component fault fixes,
   wherein said diagnoser is configured to:
      access said version modification and said component fault and component fault fix records;
      count, for each software component of said software system, a number of revisions made to a source file up to a last release and a number of developers who contributed to development of said source file; and
      predict that a given software component is faulty if the number of revisions or modifications is greater than a first predetermined threshold or if the number of developers who contributed to development of said source file is greater than a second predetermined threshold.

9. The system according to claim 8, wherein the diagnoser comprises a machine learning algorithm for characterizing the given software component, and a prediction model generator for generating a model that is capable of classifying the given software component as faulty or healthy based on said characterization.

10. The system according to claim 9, wherein the diagnoser is configured to:
    a) provide the version modification records and the component fault and component fault fix records as input to the machine learning algorithm;
    b) define a set of features capable of characterizing any software component;
    c) characterize components of said software system by deriving, from said input, values for said features;
    d) associate, by the machine learning algorithm, between said derived feature values of a component and whether the component is faulty or healthy; and
    e) generate a score being a real number indicating a probability of the given software component to be faulty, according to said derived feature values.

11. The system according to claim 10, wherein the diagnoser comprises a fault diagnosis software module which is configured to:
    a) output a diagnosis, following processing of the fault prediction, indicating for the given software component, whether it is faulty or healthy; and
    b) output a posterior probability as to whether said outputted diagnosis is correct.

12. The system according to claim 11, wherein faults are diagnosed in software components of a software module that controls a GPS receiver.

13. The system according to claim 10, wherein the diagnoser is configured to input to the fault diagnosis software module: i) the components of the system; ii) a set of observed test executions with their traces, each test labeled "passed" or "failed"; and iii) the score of each component as a prior probability of each component to be faulty.

* * * * *